INVENTOR.
Jan C. Somer
BY
Watson, Cole, Grindle + Watson
ATTORNEY

United States Patent Office 3,516,054
Patented June 2, 1970

3,516,054
ULTRASONIC TRANSMITTER
Jan C. Somer, Odijk, Netherlands, assignor to Nederlandse Organisatie voor Toegepast-Natuurweten-Schappelijk Onderzoek ten Behoeve van de Volksgezondheid, The Hague, Netherlands, a corporation of the Netherlands
Filed Mar. 1, 1968, Ser. No. 709,721
Claims priority, application Netherlands, Mar. 7, 1967, 6703603
Int. Cl. H04b 11/00
U.S. Cl. 340—15
3 Claims

ABSTRACT OF THE DISCLOSURE

The invention relates to an ultrasonic transmitter for material investigation provided with an antenna consisting of an array of electro-mechanical transducer elements and means for exciting each of the elements of the array which means include a plurality of multivibrators triggered simultaneously from a central generator source. Each multivibrator provides an impulse output which is detected by a detector to excite an oscillator driving each of the transducer elements.

---

The invention relates to an ultrasonic transmitter for material investigation provided with an array of electro-mechanical elements (arrayed transducer) and means to activate the elements at the same frequency but at different phases. Such ultrasonic transmitters are known.

In such devices the transmitter comprises a variable oscillator that feeds a delay line with a number of sections equal to the number of elements, an oscillator on a fixed frequency synchronized with the first modulator that gives a pulse-shaped output signal with a frequency equal to the beat frequency of both oscillators and a number of secondary modulators each of which feeds an element by means of an output signal via a filter and an amplifier each of which is fed by a signal delayed by a corresponding number of sections of the line and the output signal of the first modulator.

The drawback of such a device is that it cannot produce ultrasonic pulses of short duration because the modulators produce side-bands that must be filtered.

For that purpose of the filters must have a narrow bandwidth so that the device cannot be used for short pulses, which require a large bandwidth.

Short ultrasonic pulses are essential, however, for material investigation in order to obtain from the echos, resulting from, for example a flaw in the material to be detected, a good picture of the shape of the flaw.

The invention provides improved means that are easily adjusted, and have great flexibility and afford a lower limit for the pulse length determined only by the transducer itself.

The invention comprises an oscillator with a trigger-input, a monostable multivibrator with a start-input and with means to adjust the impulse length of the impulses generated by this multivibrator and a means to detect the trailing-edge of the impulses for each electro-mechanical element, and a central impulse generator, the central impulse generator being connected with the start-inputs of the multivibrators, and the detection means being interpositioned between the outputs of the multivibrators and the trigger-inputs of the oscillators.

The elements of the transducer array, which in general will be fixed besides each other and in one plane, must be excited one after another with the same frequency but in a certain shifted phase with respect to one another to emit a sonic beam in a certain direction in that plane.

The detection means that provide for the excitation of the elements are controlled by the trailing-edges of the impulses generated by the monostable multivibrators.

The multivibrators are all triggered by the central impulse generator at the same time; consequently, the impulse length determines the phase of the electrical signal supplied to the elements.

In a preferred embodiment, the means for controlling the impulse length of the generated impulses comprise a central control voltage and a permanently adjusted voltage divider for each multivibrator.

Preferably the central control voltage is variable thus making it possible to change the direction of the beam in a plane.

In an embodiment of the invention a plane is scanned step-by-step; for this purpose the central control voltage is adjustable step-by-step and the voltage steps are initiated by a signal of the central impulse generator. The invention will now further be described by means of the following figures.

In the figures, like designations refer to like elements.

Figure 1:
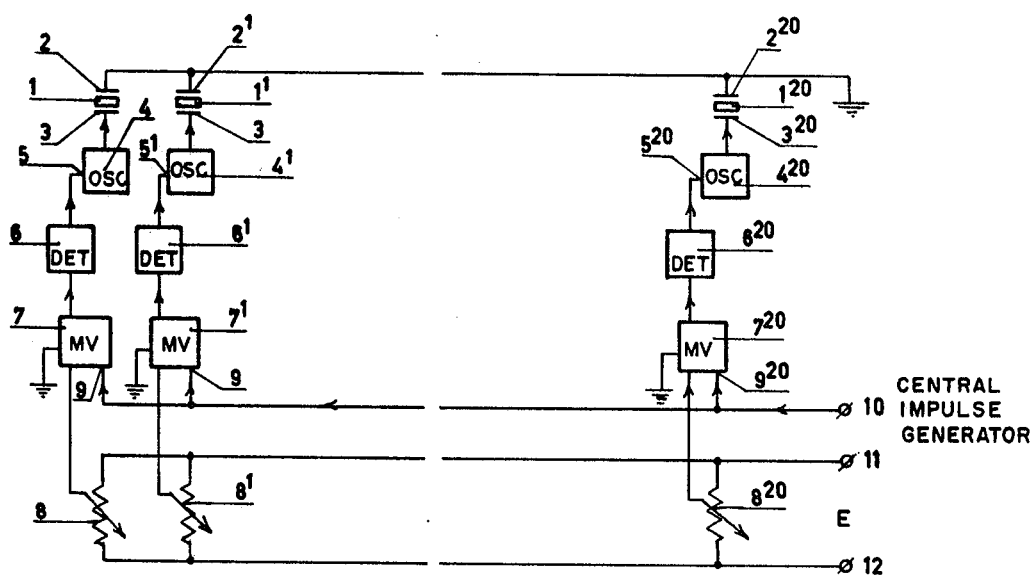
FIG. 1 is a block diagram of an embodiment of the invention.

In FIG. 1 the elements of an arrayed transducer are indicated by the numbers 1–1$^{20}$.

Each element 1–1$^{20}$ is provided with its own oscillator 4–4$^{20}$, trailing-edge detector 6–6$^{20}$, monostable multivibrator 7–7$^{20}$ and voltage divider 8–8$^{20}$. In the embodiment elements 1–1$^{20}$ consist of piezoelectric crystals.

On each top plate 2–2$^{20}$ and bottom 3–3$^{20}$ of a crystal 1–1$^{20}$ an electric has been applied. By placing the 21 crystals 1–1$^{20}$ with their long sides against each other, interpositioning a sheet of insulating Teflon and embedding the whole in a solid rim of synthetic resin an arrayed transducer of ten by eleven mm. is obtained.

Electrodes 3–3$^{20}$ are connected with oscillators 4–4$^{20}$.

Oscillators 4–4$^{20}$ each are connected with their trigger-inputs 5–5$^{20}$ to a trailing-edge detector 6–6$^{20}$ that is in turn connected to a monostable multivibrator 7–7$^{20}$.

The moment when a triggered monostable multivibrator 7–7$^{20}$ returns again to its normal state generates a short impulse by appurtenant detector 6–6$^{20}$; the former initiating appurtenant oscillator 4–4$^{20}$ whereafter the latter freely vibrates with a short pulse train.

Oscillators 4–4$^{20}$ all are adjusted to the same frequency but they are successively excited at different moments owing to the fact that multivibrators 7–7$^{20}$ return to their normal state at different moments.

By choosing the curve of these phase shifts correctly the main lobe of the sonic beam can be directed in a certain direction.

The moment of switching to the normal state is adjusted for each monostable multivibrator 7–7$^{20}$ individually by voltage dividers 8–8$^{20}$.

The impulse length of monostable multivibrators 7–7$^{20}$ is directly proportional to the voltage provided by voltage dividers 8–8$^{20}$ from the central control voltage E.

Multivibrators 7–7$^{20}$ all are triggered at the same time at a start impulse from a central impulse generator provided at terminal 10.

The central impulse generator emits 1000 impulses per second.

Figure 2:
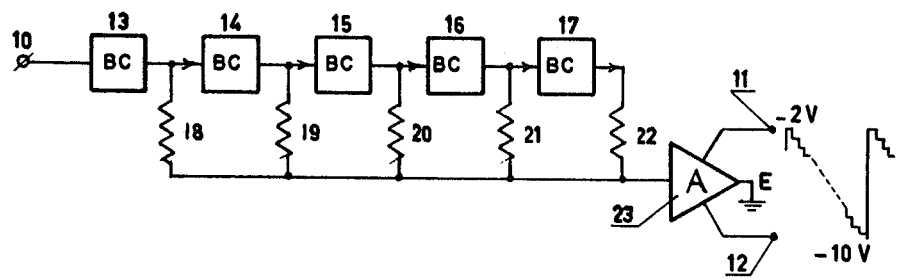
FIG. 2 is a block diagram of a generator for the generation of a step-by-step surging voltage.

In FIG. 2 binary unit counters 13–17 and resistors 18–22 form a circuit, which, via direct voltage amplifier 23, provides, at any impulse to terminal 10 emanating from the pulse generator, to terminals 11 and 12 a voltage reduced by one step, which voltage periodically returns to its starting voltage after 32 impulses.

This step voltage, provided to terminals 11 and 12 of

FIG. 1 insures that the beam is sent out in 32 directions 1000/32 times per second, because by alternating voltage E the moment of returning of monostable multivibrators $7-7^{20}$ to the normal state is alternated.

Figure 3:
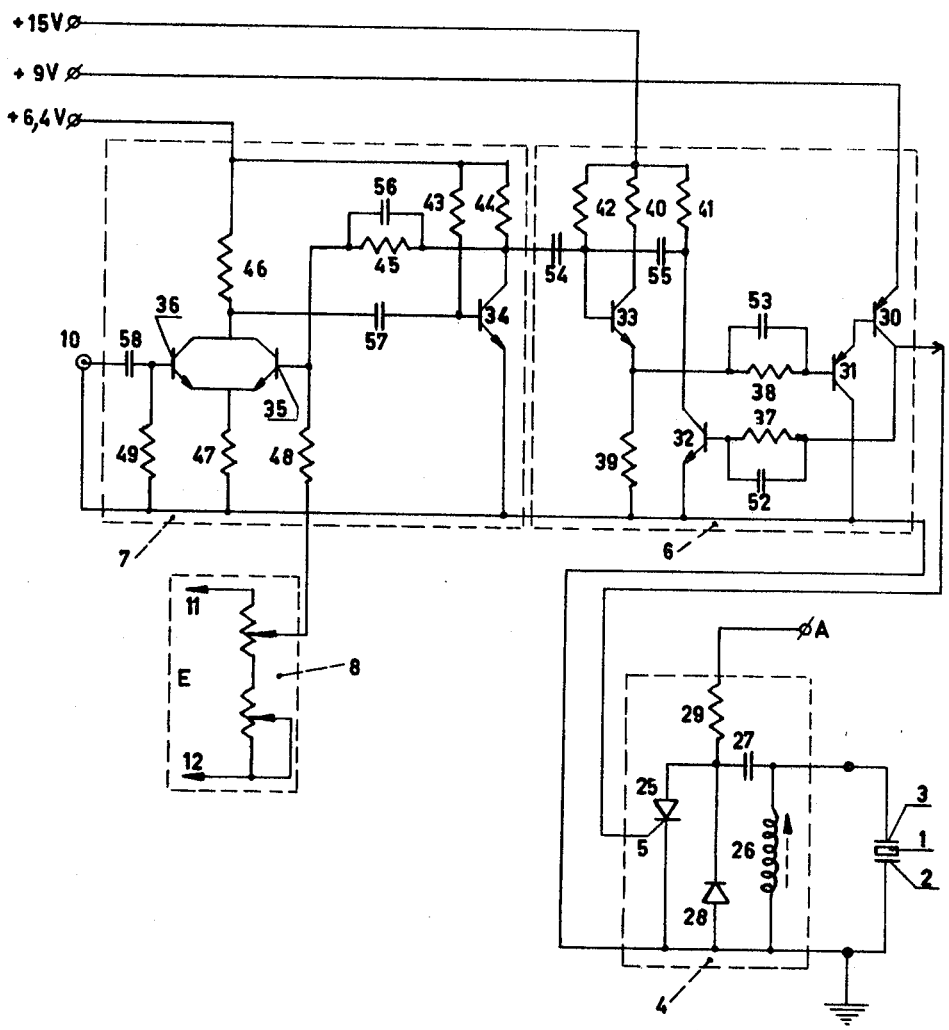
FIG. 3 illustrates typical circuit diagrams for the circuitry shown in FIG. 1.

In FIG. 3 element 1 with the appurtenant circuits, oscillator 4, detector 6, adjustable monostable multivibrator 7 and voltage divider 8—indicated by dotted lines—are shown in detail.

Detector 6 further comprises means for operating the starting signal for rendering thyristor 25 in initiating or oscillator circuit 4 conducting for a short time thereby enabling condenser 27 to discharge itself through coil 26. After every discharge of condenser 27 the later is recharged again by a direct voltage at terminal A via a high ohmic resistance.

Thyristor 25 in conductive conditions form, together with diode 28, a bi-directional closed switch, which closes LC-circuit 26–27, so that through the discharge of condenser 27 a short damped oscillation is generated during only a few periods with a frequency of about 1.3 megacycles/second, which is transferred to oscillate crystal 1.

Circuits 6 and 7 are of the conventional type understood by those skilled in the art and therefore are not further described.

The elements shown in FIG. 3 have values stated in the table below.

Resistances:
    29—100K ohms
    37—68K ohms
    38—8K ohms
    39—1K
    40—560 ohms
    41—2K ohms
    42—47K ohms
    43—33K ohms
    44, 46—390 ohms
    45—1K ohms
    47—680 ohms
    48—3K ohms
    49—22K ohms Condensers:
    27—1000 picofarads
    52—820 picofarads
    53—150 picofarads
    54—82 picofarads
    55—330 picofarads
    56—15,000 picofarads
    57—2200 picofarads
    58—2700 picofarads Transistors:
    30, 31—Motorola MM 2712
    32, 33, 34, 35, 36—Motorola MM 2711

Thyristor 25—RCA TA 2653.
Diode 28—Philips OA 202.
Inductor 26—25 microhenrys
Piezo electrical element $1-1^{20}$ consisting of 21 crystals each with a length of 10 mm., thickness of 0.48 mm. and height of 1.4 mm.

I claim:
1. An ultrasonic transmitter provided with an array of electro-mechanical transducer elements and excitation means to excite each element at the same frequency but at different phases, comprising;
    a central impulse generator providing control signals, and wherein each of the excitation means comprises;
    monostable multivibrator switching means for generating impulse output signals in response to said control signals,
    means for controlling said multivibrator to adjust the width of said impulse output signals, said means for controlling including a variable control voltage and a voltage divider for providing a desired voltage signal to said multivibrator,
    means for detecting the trailing edge of said impulse output signals, and
    oscillator means responsive to said detection means for exciting a transducer element.

2. An ultrasonic transmitter according to claim 1 wherein said central impulse generator provides repetitive triggering impulses and a cyclic staircase voltage, said triggering impulses triggering the multivibrator of each excitation means simultaneously and said staircase voltage controlling said multivibrator to provide an impulse output signal at a predetermined time to control the ultrasonic transmission of each transducer element.

3. An ultrasonic transmitter according to claim 2 wherein said central impulse generator includes a plurality of series connected binary counters responsive to said repetitive triggering impulses and an amplifier connected to the output of the terminal binary counter for generating said staircase voltage.

References Cited

UNITED STATES PATENTS

| | | | |
|---|---|---|---|
| 3,056,961 | 10/1962 | Mitchell. | |
| 3,324,435 | 6/1967 | Brightman | 340—.5 |
| 3,342,283 | 9/1967 | Pound | 181—.5 |
| 3,346,837 | 10/1967 | Pommerening | 340—5 |

RICHARD A. FARLEY, Primary Examiner

U.S. Cl. X.R.

340—5